US006277186B1

(12) United States Patent
Shi et al.

(10) Patent No.: US 6,277,186 B1
(45) Date of Patent: Aug. 21, 2001

(54) THERMALLY-INHIBITED STARCH PREPARED WITH OLIGOSACCHARIDES

(75) Inventors: Yong-Cheng Shi, Neshanic Station, NJ (US); Jennifer Goodall, Wilmington, DE (US); Roger Jeffcoat, Bridgewater, NJ (US)

(73) Assignee: National Starch and Chemical Investment Holding Corporation, Wilmington, DE (US)

( * ) Notice: Subject to any disclaimer, the term of this patent is extended or adjusted under 35 U.S.C. 154(b) by 0 days.

(21) Appl. No.: 09/323,366

(22) Filed: Jun. 1, 1999

(51) Int. Cl.$^7$ .............................. C08L 3/02; C09D 103/02
(52) U.S. Cl. .................................... 106/205.72; 106/215.5
(58) Field of Search ............................. 106/205.72, 215.5

(56) References Cited

U.S. PATENT DOCUMENTS

| | | | |
|---|---|---|---|
| 4,247,568 | 1/1981 | Carrington et al. | 426/321 |
| 5,641,349 | 6/1997 | Koubek et al. | 106/206.1 |
| 5,718,770 | 2/1998 | Shah et al. | 127/65 |
| 5,720,822 | 2/1998 | Jeffcoat et al. | 127/65 |
| 5,725,676 | 3/1998 | Chiu et al. | 127/34 |
| 5,830,884 | 11/1998 | Kasica et al. | 514/160 |
| 5,846,786 | 12/1998 | Senkeleski et al. | 435/96 |
| 5,871,756 | 2/1999 | Jeffcoat et al. | 424/401 |
| 5,904,940 | 5/1999 | Senkeleski et al. | 426/52 |

FOREIGN PATENT DOCUMENTS

| | | |
|---|---|---|
| 39742 C | 5/1887 | (DE) . |
| 0898899A | 3/1999 | (EP) . |
| 996367A | 6/1965 | (GB) . |
| WO 9504082A | 2/1995 | (WO) . |

OTHER PUBLICATIONS

Theander, et al., "Studies on Chemical Modifications in Heat–Processed Starch and Wheat Flour" Starke 39 (1987) No Month Provided Nr. 3, S. 88–93.

Siljestrom et al., "Transglycosidation Reactions following Heat Treatment of Starch—Effects on Enzymic Digestibility" Starke 41 (1989) No Month Provided Nr. 3, S. 95–100.

Hippleheuser A. L. et. al., "A System Approach to Formulating A Low–Fat Muffin Pregelatinized Dull Waxy Corn Starches May be Used To Reduce Fat In Bakery Products", *Food Technology, US, Instittue of Food Technologists.* vol. 49, No. 3, Mar. 1, 1995, pp. 92–96 XP000495808 SSN: 0015–6639 p. 93, Left–hand column; table 1.

*Primary Examiner*—David Brunsman
(74) *Attorney, Agent, or Firm*—Laurelec A. Donan, Esq.; Karen Kaiser, Esq.

(57) ABSTRACT

The present invention is directed to a process of preparing thermally inhibited starches using the low molecular weight carbohydrates to improve the rate of inhibition. The resulting starch/low molecular weight carbohydrate blends have improved cold storage stability and may be used in a variety of products, particularly food products.

23 Claims, 1 Drawing Sheet

Figure 1.

THERMALLY-INHIBITED STARCH PREPARED WITH OLIGOSACCHARIDES

BACKGROUND OF THE INVENTION

The present invention relates to the process of thermally treating starch in the presence of an low molecular weight carbohydrate to improve the rate of thermal inhibition of the starch. Under certain processing conditions, the resultant starch/low molecular weight carbohydrate blend has improved cold storage stability.

Numerous starch products prepared using a variety of processes are known in the art. These include starches which are prepared by thermal inhibition. For example, U.S. Pat. No. 5,725,676 discloses thermally inhibited starches and flours and European Patent Application Publication No. 0 735 827 discloses their use in food products.

Thermal inhibition provides starch which meets consumer demands for foods as they are not chemically modified, but still have the same functional properties as chemically modified foods. These properties include excellent tolerance to processing variables such as heat, shear, and pH extremes; smooth texture; and viscosity stability throughout the processing operation and normal shelf life of the food.

Aqueous dispersions of cross-linked (chemically inhibited) starch are often used under conditions which involve prolonged storage at relatively low temperature and/or exposure, at times, to repeated freezing and thawing cycles. For example, starch dispersions are used in numerous food products such as canned and frozen foods, particularly fruit preps, pies, soups, and the like. In the case of canned food products, these are often stored in warehouses which have no heating facilities and may therefore be at very low temperatures for prolonged periods and may freeze during shipping. Frozen foods are also subject to long term storage at very low temperatures as well as freezing and thawing during distribution and consumer storage. Under such circumstances involving exposure to low temperature, there is typically a distinct loss in the hydrating power of the starch which is present in such food products, thereby resulting in syneresis, an extrusion of liquid, together with a marked deterioration in the texture and clarity of the food product. While sols of waxy maize starch are superior in stability to those of regular corn starch, even they are prone to intermolecular association during storage at or near freezing temperature.

Surprisingly, it has now been discovered that the presence of low molecular weight carbohydrate improves the rate of thermal inhibition of starches and, under certain conditions, result in starch/low molecular weight carbohydrate blends with improved cold storage stability.

SUMMARY OF THE INVENTION

The present invention is directed to a process of preparing thermally inhibited starches using low molecular weight carbohydrate to improve the rate of inhibition. Under certain conditions, the resulting starch/low molecular weight carbohydrate blends have improved cold storage stability and may be used in a variety of products, particularly food products.

Thermal inhibition, as used herein, refers to a process by which the starch/low molecular weight carbohydrate blend becomes and remains inhibited without the necessity of chemical reagents. When thermally inhibited starches are used in products, they exhibit substantially the same characteristics of a chemically crosslinked (i.e. inhibited) starch.

A thermally-inhibited starch/low molecular weight carbohydrate blend means at last one starch and at least one oligosaccharide which have been intimately blended, dehydrated to anhydrous or substantially anhydrous, and heat-treated with sufficient dry heat at an appropriate pH, preferably neutral to basic, to provide the starch with functional characteristics similar to those of a chemically crosslinked starch, wherein the starch is granular and either non-pregelatinized or pregelatinized. Further, a thermally-inhibited starch/low molecular weight carbohydrate blend is intended to include those products in which the low molecular weight carbohydrate has been removed from starch after thermal processing.

DETAILED DESCRIPTION OF THE INVENTION

The present invention is directed to a process of preparing thermally inhibited starches using low molecular weight carbohydrate to improve the rate of inhibition. The resulting starch/low molecular weight carbohydrate blends have improved cold storage stability and may be used in a variety of products, particularly food products.

All starches and flours (hereinafter "starch") may be suitable for use herein and may be derived from any native source. A native starch or flour as used herein, is one as it is found in nature. Also suitable are starches and flours derived from a plant obtained by standard breeding techniques including crossbreeding, translocation, inversion, transformation or any other method of gene or chromosome engineering to include variations thereof. In addition, starch or flours derived from a plant grown from artificial mutations and variations of the above generic composition which may be produced by known standard methods of mutation breeding are also suitable herein.

Typical sources for the starches and flours are cereals, tubers, roots, legumes and fruits. The native source can be corn, pea, potato, sweet potato, banana, barley, wheat, rice, sago, amaranth, tapioca, arrowroot, canna, sorghum, and waxy or high amylose varieties thereof. As used herein, the term "waxy" is intended to include a starch or flour containing at least about 95% by weight amylopectin and the term "high amylose" is intended to include a starch or flour containing at least about 40% by weight amylose.

Conversion products derived from any of the starches, including fluidity or thin-boiling starches prepared by oxidation, enzyme conversion, acid hydrolysis, heat and or acid dextrinization, and or sheared products may also be useful herein.

Chemically modified starches may also be used. Such chemical modifications are intended to include without limitation crosslinked starches, acetylated and organically esterified starches, hydroxyethylated and hydroxypropylated starches, phosphorylated and inorganically esterified starches, cationic, anionic, nonionic, and zwitterionic starches, and succinate and substituted succinate derivatives of starch. Such modifications are known in the art, for example in Modified Starches: Properties and Uses, Ed. Wurzburg, CRC Press, Inc., Florida (1986).

Any starch or starch blends having suitable properties for use in food products herein may be purified by any method known in the art to remove off flavors and colors that are native to the starch or created during starch modification processes. Suitable purification processes for treating the instant starches are disclosed in the family of patents represented by EP 554 818 (Kasica, et al.). Alkali washing techniques, for starches intended for use in either granular or pregelatinized granular form, are also useful and described in the family of patents represented by U.S. Pat. No. 4,477,480 (Seidel) and 5,187,272 (Bertalan et al.).

Any low molecular weight carbohydrate as defined herein may be suitable for use and may be derived from any native source such as those listed above. The source may be the same as or different from that of the starch component. As defined herein, a low molecular weight carbohydrate is intended to include monosaccharides, disaccharides, oligosaccharides, corn syrup solids, and maltodextrins. The low molecular weight carbohydrate suitable for the present invention include, but are not limited to, debranched starches, corn syrup solids, dextrose, fructose, maltose, particularly corn syrup solids with a DE of from about 20 to 40. The source of the low molecular weight carbohydrate may be derived from any native source such as those listed above.

Although low molecular weight carbohydrate is intended to include mono-saccharides, these generally add color and/or flavor which may be undesirable in many industrial applications. Therefore, particularly suitable low molecular weight carbohydrate for the present invention are those which contain at least two sugar units joined by glycosidic bonds.

Dextrose equivalent (DE) is defined as the reducing power of the hydrolysate. Each starch molecule has one reducing end; therefore DE is inversely related to molecular weight. The DE of anhydrous D-glucose is defined as 100 and the DE of unhydrolyzed starch is virtually zero.

The low molecular weight carbohydrate be added to the starch or produced in situ by methods known in the art. For example, the low molecular weight carbohydrate may be produced using at least one of a variety of enzymes known to hydrolyze starch, including but not limited to alpha-amylases, beta-amylases, glucoamylases, maltogenases and pullulanases.

The starch and low molecular weight carbohydrate must be intimately blended prior to thermal inhibition. This may be accomplished by slurrying the starch and the low molecular weight carbohydrate in water. In the alternative, the blend may be slurried in a buffered solution so that the pH is brought within the desired range. Dry blending the starch and low molecular weight carbohydrate is unsuitable for the present invention in that the rate of thermal inhibition is not improved.

The starch and low molecular weight carbohydrate are generally slurried at from about 10 to about 60%, particularly from about 20 to 45% total solids. The blend of starch to low molecular weight carbohydrate may be in any ratio which allows for hastened inhibition, particularly from about 85:15 to 99:1, more particularly from about 93:7 to 98:2.

Thermal inhibition is known in the art and has been disclosed, for example, in European Patent Application Publication No. 0 721 471. Native granular starches have a natural pH of about 5.0 to 6.5. When such starches are heated to temperatures above about 125° C. in the presence of water, acid hydrolysis (degradation) of the starch occurs which may impede or prevent inhibition. Therefore, the dehydration conditions need to be chosen so that degradation is avoided. Suitable conditions are dehydrating at low temperatures and the starch's natural pH or dehydrating at higher temperatures after increasing the pH of the starch to neutral or above. As used herein, the term "neutral" covers the range of pH values around pH 7 and is meant to include from about 6.5 to 7.5. At a pH above about 12, gelatinization occurs more easily so a pH of below about 12 is generally more effective in the instant invention. In particular, a pH of about 8.5 to 10.5 is effective in the instant invention. The textural and viscosity benefits of the thermal inhibition process tend to be enhanced as the pH is increased although the browning also tends to increase.

The pH may be adjusted by any method known in the art. For example, the ungelatinized granular starch may be slurried in water or another (buffered) aqueous medium and the pH may be raised by the addition of any suitable base. Buffers, such as sodium carbonate, may be used to maintain the pH if needed. Alternatively, a solution of a base may be sprayed onto the powdered starch until the blend attains the desired pH, or an alkaline gas such as ammonia can be infused into the blend.

After the pH adjustment, the slurry is then either dewatered and dried, or dried directly, typically to a moisture content of from about 2 to about 15%, particularly from about 4 to about 12%, by weight. These drying procedures are to be distinguished from the thermal inhibition process steps in which the starch/low molecular weight carbohydrate blend is dehydrated to anhydrous or substantially anhydrous and then heat treated.

A particularly suitable method is to slurry the starch and low molecular weight carbohydrate in water and adjust the pH to neutral or greater by the addition of a base. As used herein, "neutral" covers the range of pH values around pH 7 and is meant to include from about pH 6.5 to about pH 7.5. The starch/low molecular weight carbohydrate blend may be dried to a moisture content of from about 2 to about 15%, particularly from about 4 to about 12% by weight. The blend is then dehydrated to anhydrous or substantially anhydrous and heat treated to thermally inhibit the starch. If the starch is to be pregelatinized prior to thermal inhibition, it may be simultaneously pregelatinized and dried and the dried starch/low molecular weight carbohydrate blend is then dehydrated and thermally-inhibited.

Suitable bases for use in the pH adjustment step include, but are not limited to, sodium hydroxide, sodium carbonate, tetrasodium pyrophosphate, ammonium orthophosphate, disodium orthophosphate, trisodium phosphate, calcium carbonate, calcium hydroxide, potassium carbonate, and potassium hydroxide, and any other bases approved for use under the applicable regulatory laws. A particularly suitable base is sodium carbonate. It may be possible to use bases not approved provided they can be washed from the starch or flour so that the final product conforms to good manufacturing practices for the desired end use.

The blend of starch to low molecular weight carbohydrate may be in any ratio which allows for an improved rate of inhibition. After dewatering or drying, the percent of low molecular weight carbohydrate on a starch basis (w/w) is particularly at least about 0.25%, more particularly at least 0.5%, most particularly at least about 1.0%. In general, no more than about 15% low molecular weight carbohydrate on a starch basis (w/w) is used as above this level there is no significant increase in the rate of thermal inhibition.

The dehydration may be a thermal dehydration or a non-thermal dehydration.

A thermal dehydration is carried out by heating the starch/low molecular weight carbohydrate blend in a heating device for a time and at a temperature sufficient to reduce the moisture content to less than about 1% by weight, particularly essentially 0%. In general, the temperatures used are less than about 135° C., particularly about 100 to 120° C. The dehydrating temperature can be lower than 100° C., but a temperature of at least about 100° C. will be more efficient for removing moisture.

Representative processes for carrying out a non-thermal dehydration include freeze drying or extracting the water from the starch/blend using a solvent, particularly a hydrophilic solvent, more particularly a hydrophilic solvent which forms an azeotropic mixture with water (e.g., ethanol).

The solvent dehydration step may be carried out in any suitable extraction apparatus known in the art, particularly any continuous extraction apparatus.

For dehydration by freeze drying, the starch/low molecular weight carbohydrate blend (at a moisture of about 4 to 5%) is placed on a tray and put into a freeze dryer. A suitable bulk tray freeze dryer is available from FTS Systems of Stone Ridge, N.Y. under the trademark Dura-Tap. The freeze dryer is run through a programmed cycle to remove the moisture. The temperature is held constant at about 20° C. and a vacuum is drawn to about 50 milliTorr (mT). The starch or flour is removed from the freeze dryer and immediately placed into a suitable heating apparatus for the heat treatment.

After it is dehydrated, the starch/low molecular weight carbohydrate blend is heat treated for a time and at a temperature sufficient to inhibit the starch. In general, heating temperatures greater than about 100° C. are used. For practical purposes, the upper limit of the heat treating temperature is about 200° C. Typical temperatures are from about 120 to 180° C., particularly from about 140 to 160° C., more particularly about 150° C. The temperature selected will depend upon the amount of inhibition desired and the rate at which it is to be achieved.

The time at the final heating temperature will depend upon the level of inhibition desired. When a conventional oven is used, the time ranges from about 0.5 to 24 hours, particularly from about 1 to 8 hours. When a fluidized bed is used, the times range from about 25 minutes to three hours, particularly from about 25 to 100 minutes, more particularly from about 25 to 50 minutes. Longer times are required at lower temperatures to obtain more inhibited starch/low molecular weight carbohydrate blends.

In general, the starch/low molecular weight carbohydrate blend will obtain the same degree of inhibition and the corresponding functional characteristics in from about 20% to about 50% of the time it would take the starch alone. In the alternative, the same degree of inhibition and the corresponding functional characteristics may be achieved at a lower temperature.

For most applications, the thermal dehydrating and heat treating steps will be continuous and accomplished by the application of heat to the starch/oligosaccharide blend beginning from ambient temperature. The moisture will be driven off during the heating and the blend will become anhydrous or substantially anhydrous. Usually, at these initial levels of inhibition, the peak viscosities are higher than the peak viscosities of starch/low molecular weight carbohydrate blends heated for longer times, although there will be greater breakdown in viscosity from the peak viscosity. With continued heat treating the peak viscosities are lower, but the viscosity breakdowns are less.

The source of the starch or flour, the source and type of oligosaccharide, the initial pH, the dehydrating conditions, the heating time and temperature, and the equipment used are all interrelated variables that affect the amount of inhibition.

The heating steps may be performed at normal pressures, under vacuum or under pressure, and may be accomplished by conventional means known in the art particularly by the application of dry heat in dry air or in an inert gaseous environment.

The heat treating step can be carried out in the same apparatus in which the thermal dehydration occurs. Most conveniently the process is continuous with the thermal dehydration and heat treating occurring in the same apparatus, as when a fluidized bed is used.

The process of making the blends of the present invention may be batch or continuous. The present invention is particularly suitable for continuous processing due to its faster rate of thermal inhibition.

The dehydrating and heat treating apparatus can be any industrial oven, conventional oven, microwave oven, dextrinizer, dryer, mixer or blender equipped with heating devices and other types of heaters, provided that the apparatus is fitted with a vent to the atmosphere so that moisture does not accumulate and precipitate onto the starch or flour. In particular, the apparatus is a fluidized bed, particularly one in which the apparatus is equipped with a means for removing water vapor, such as a vacuum or a blower to sweep air or the fluidizing gas from the head-space of the fluidized bed. The fluidized bed can be gas fluidized or mechanically fluidized. Suitable fluidizing gases include air and nitrogen, particularly dry air. For safety reasons, a gas containing less than 12% oxygen is particularly suitable.

The thermal inhibition may be carried out to any desired level. For example, lightly inhibited starch/low molecular weight carbohydrate blends may show an increase in peak viscosity and a lower percentage viscosity breakdown compared to the same blend which has not been inhibited. Moderately inhibited granular blends have a reduced gelatinization temperature and a lowered enthalpy, also exhibiting a lower peak viscosity and a lower percentage viscosity breakdown compared to the same blend which has not been inhibited. Starch/blends which are highly inhibited will gelatinize to a limited extent and show a continuing rise in viscosity but will not attain a peak viscosity while substantially completely inhibited will tend to resist gelatinization.

Superior inhibited starch/low molecular weight carbohydrate blends having non-cohesive, high viscosities with low percentage breakdown in viscosity are obtained in shorter times in the fluidized bed than can be achieved using other conventional heating ovens or dryers.

The amount of thermal inhibition desired will depend upon the end use of the blend, such as whether it is used to thicken, gell or extend, as well as the processing parameters it will undergo during the end use application.

The starch in the starch/low molecular weight carbohydrate blend may be pregelatinized either prior or subsequent to the heat treatment. Pregelatinization methods known in the art may be used and are carried out in such a way that a majority of the starch granules are swollen, but remain intact. Exemplary processes for preparing pregelatinized granular starches are disclosed in U.S. Pat. Nos. 4,280,851, 4,465,702, 5,037,929, and U.S. Pat. No. 5,149,799, the disclosure of which are incorporated by reference.

The amount of pregelatinization, and consequently, whether the starch/low molecular weight carbohydrate blend will display a high or a low initial viscosity when dispersed in water, can be regulated by the pregelatinization procedures. In general, if the pregelatinization step is accomplished by spray-drying, the longer the residence time in the spray nozzle and the higher the ratio of steam to starch, the higher the initial viscosity of the pregelatinized granular starch/low molecular weight carbohydrate blend when it is subsequently dispersed in water.

The thermal inhibition process and pregelatinization may be carried out prior to or after other starch reactions used to modify starch, such as, heat- and/or acid-conversion, oxidation, phosphorylation, etherification, esterification, chemical crosslinking, enzyme modification, and the like. Usually these modifications are performed before the starch is thermally inhibited. Procedures for modifying starches are described in the chapter "Starch and its Modification" by M. W. Rutenberg, pages 22–26 to 22–47, Handbook of Water Soluble Gums and Resins, R. L. Davidson, Editor (McGraw-Hill, Inc., New York, N.Y. 1980). These modifications are not preferred in applications where a food manufacturer requires a non-chemically modified starch.

The starch/low molecular weight carbohydrate blend may contain one or more starches and one or more low molecular weight carbohydrate. They may be inhibited in the presence of other materials or ingredients that would not interfere with the thermal inhibition process or adversely affect the properties of the inhibited blend.

Following the thermal inhibition step, the resulting starch/low molecular weight carbohydrate blend may be screened to the desired particle size.

If the starch is not pregelatinized, the inhibited starch/low molecular weight carbohydrate blend may be further purified by slurrying in water, filtering, and drying, particularly by spray-drying or flash drying. If the starch is a granular pregelatinized starch, the starch/low molecular weight carbohydrate blend can be washed by any method known in the art that will maintain granular integrity. If desired, the pH may be adjusted. Optionally, the blend may be bleached.

The thermally-inhibited granular starch/low molecular weight carbohydrate blends, both non-pregelatinized and pregelatinized, may be mixed with other blends, unmodified or modified starches, including pregelatinized starches, or with other ingredients before use in a product.

The resultant starch/low molecular weight carbohydrate blend may be adjusted to the desired pH according to its intended end use. In general, for food applications the pH is adjusted to from about 5.0 to about 7.5, particularly from about 6.0 to about 7.0, using techniques known in the art.

The resultant starch/low molecular weight carbohydrate blend may be further processed. For example, gelatinization may be desirable in some applications such as in instant products and/or in products in which the starch is typically not cooked out.

Optional steps may also be carried out to improve the color and/or flavor, such as washing the starch/low molecular weight carbohydrate blend with water and/or removing undesirable constituents from the starch or flour prior to the dehydrating step and/or after the heat treating step. A bleaching agent (e.g., sodium chlorite) or an alkali may also be used for the removal of impurities. In particular, washing of the blend may be desirable after thermal inhibition to remove at least some of the residual low molecular weight carbohydrate and reduce the flavor and/or color of the starch product.

The thermally inhibited starch/low molecular weight carbohydrate blends may be further inhibited by crosslinking, for example using phosphorous oxychloride, epichlorohydrin, sodium trimetaphosphate, or adipic/acetic mixed acid anhydrides. Procedures for crosslinking starches may be used and are known in the art, for example in Handbook of Water soluble Gums and Resins, R. L. Davidson, Editor, pp. 22–47, McGraw-Hill, Inc., NY (1980).

The resulting starch/low molecular weight carbohydrate blend is characterized by a relatively high viscosity, moderate cohesiveness or gel strength, heat and shear tolerance, short texture, excellent water holding ability, neutral taste, and by its unique functionality in food products. These desirable characteristics may be obtained without chemical modification and in a relatively short processing time.

Further, under certain thermally inhibition conditions, the resulting starch/low molecular weight carbohydrate blends have improved cold storage stability, including low temperature and freeze-thaw stability. The low temperature and freeze-thaw stability of the present blends generally increases with increased thermal processing. Further, the low temperature and freeze-thaw stability of the present blends is significantly better than that of thermally inhibited starches which are not processed with low molecular weight carbohydrate.

A good indication of the stability of a starch under cold storage stability is the delta H value determined by differential scanning calorimetry (DSC) of the starch. The delta H value shows the extent of starch recrystallization (retrogradation). Thus, a lower value is indicative of better cold storage stability.

The degree of cold storage stability of the thermally inhibited starch/low molecular weight carbohydrate blends will depend upon a number of variables including the type of base starch used, the type and amount of low molecular weight carbohydrate used, and the temperature and time of thermal inhibition. In general, the thermally inhibited starch/low molecular weight carbohydrate blends of present invention have a delta H of no more than about 7.5 J/g when waxy corn is used as the base starch and a delta H of no more than about 6.0 J/g when tapioca is used as the base starch. Further, the delta H is generally at least about 15%, particularly at least about 20%, more particularly at least about 25%, less than that of the starch thermally inhibited in the absence of an low molecular weight carbohydrate.

Improved low temperature and freeze thaw stability is important in a variety of food applications in which the food is exposed to prolonged storage at relatively low temperatures, including freezing temperatures, and/or exposure to repeated freezing and thawing cycles. This includes a variety of food products, particularly canned and frozen foods such as pies, soups, and the like. Use of the present thermally inhibited starch/low molecular weight carbohydrate blends in such applications will allow the food products to retain their quality by retarding syneresis and marked deterioration of product texture, color and clarity.

The resultant blends may be used in a variety of end use applications, including but not limited to food and beverage products, pharmaceuticals and nutraceuticals, health care products, personal care products including antiperspirants, deodorants, soaps, fragrances, and cosmetics; hair care products, such as hair sprays, mousses, shampoos, cream rinses, and gels; paper products such as diapers, sanitary napkins, paper towels, tissues, toilet tissues; animal care products such as kitty litter; and household products such as carpet cleaners, and air fresheners.

In particular, the resultant blends may be used in food products. Food products prepared with thermally inhibited starch/low molecular weight carbohydrate blends possess both process tolerance, such as resistance to heat, acid and shear, and improved texture and viscosity stability. These blends act substantially functional to chemically crosslinked starches, but differ in that their gelatinization temperatures are lower when moderately or high inhibited. Food products prepared with thermally inhibited starch/low molecular weight carbohydrate blends are substantially equivalent to foods containing crosslinked starches, but unless prepared using chemically modified starches, do not contain chemical substituents. This allows manufacturers to use natural labeling, a definite advantage with the large population of health-conscious consumers.

Food products wherein the thermally-inhibited starch/low molecular weight carbohydrate blends are useful include thermally-processed foods, acid foods, dry mixes, refrigerated foods, frozen foods, extruded foods, oven-prepared foods, stove top-cooked foods, microwavable foods, full-fat or fat-reduced foods, and foods having a low water activity. Food products wherein the thermally-inhibited blends are particularly useful are foods requiring a thermal processing step such as pasteurization, retorting, or ultra high temperature (UHT) processing, as described in Volume 217 "Physical Principles of Food Preservation" by M. Karel et al., pp. 31–92 (Marcel Dekker, Inc., New York 1975).

The thermally-inhibited blends are also particularly useful in food applications where stability is required through all processing temperatures including heating, cooling, and freezing. In food products subjected to temperature cycling operations, such as freeze-thaw cycling, a low temperature freeze-thaw stable starch or flour base, e.g., waxy maize, waxy barley, waxy rice starch or flour, amaranth starch or flour, the "V.O." hybrid waxy maize starch of U.S. Pat. No. 4,428,972 or a derivatized starch or flour (e.g., derivatized with hydroxypropyl groups) is particularly suitable.

The thermally inhibited starch/low molecular weight carbohydrate blends may also be suitable for use as "heat penetration" starches; that is, those which show little viscosity increase during the "kettle cooking" stage of the canning operation (temperatures up to about 85° C.), but which subsequently increase in viscosity during the final retorting or ultra high temperature processing stage (temperatures of about 121° C.), thus allowing for improved heat penetration and viscosity control during thermal processing.

The thermally inhibited starch/low molecular weight carbohydrate blends may also be suitable for use as "fill viscosity" starches; that is, those which cook out at a relatively low temperature, e.g., about 85° C., thus developing an initially high viscosity during the kettle cooking stage of the canning operation. This keeps particulates in the food suspended, thereby facilitating the container filling stage. The "fill viscosity" starches break down in viscosity during the final stage of retorting, thus resulting in a thinner more potable soup-like texture.

The thermally-inhibited blends are also useful in food products where a non-chemically crosslinked starch thickener, viscosifier, gelling agent, or extender is required. Based on processed food formulations, the practitioner may readily select the amount and type of thermally-inhibited, non-pregelatinized or thermally-inhibited, pregelatinized starch/low molecular weight carbohydrate blend required to provide the necessary thickness and gelling viscosity in the finished food product, as well as the desired texture.

The resultant starch/low molecular weight carbohydrate blends may be used at any level desired in food products, the amount being dependent upon the desired viscosity. In general, the blend will be used at the same level as would a chemically crosslinked starch, particularly in an amount of from about 0.01 to about 35%, more particularly from about 0.1 to about 10%, most particularly from about 2 to about 6%, by weight of the food product.

Among the food products which may be improved by the use of the thermally-inhibited blends in which the starches are non-pregelatinized or pregelatinized are high acid foods (pH<3.7) such as fruit-based pie filings, baby foods, and the like; acid foods (pH 3.7–4.5) such as tomato-based products; low acid foods (pH>4.5) such as gravies, sauces, and soups. The thermally inhibited blends are suitable for use, inter alia, in stove top-cooked foods such as sauces, gravies, and puddings; instant foods such as puddings; pourable and spoonable salad dressings; refrigerated foods such as dairy or imitation dairy products (e.g., yogurt, sour cream, and cheese); frozen foods such as frozen desserts and dinners; microwaveable foods such as frozen dinners; liquid products such as diet products and hospital foods; dry mixes for preparing baked goods, gravies, sauces, puddings baby foods, hot cereals, and the like; and dry mixes for predusting foods prior to batter cooking and frying. The thermally-inhibited blends are also useful in preparing food ingredients such as encapsulated flavors and clouds.

EXAMPLES

The following examples are presented to further illustrate and explain the present invention and should not be taken as limiting in any regard. All percents used are on a weight/weight basis. The following ingredients were used:

Lodex 5 (DE=7.1) commercially available from Staley.
Maltrin M200 commercially available from Grain Process Corp.
Cstar Dry GL (DE=24.8) commercially available from Cerestar.
Star Dri 42 (DE=42.6) commercially available from Staley.
Staley 333 Dextrose (DE=93.8) commercially available from Staley.
N-LITE® D maltodextrin (DE=4.5) commercially available from National Starch and Chemical Company.

In addition, the following basic procedure was used for differential scanning calorimetry (DSC) of samples:

Differential Scanning Calorimetry (DSC) DSC measurements were performed on a Perkin-Elmer DSC-7 instrument. Starch samples of approximately 10 mg (dry basis) were weighed into a Perkin-Elmer stainless steel pan. Water was added so that the ratio of water and starch was 1.5:1. The pan was sealed, scanned from 5° C. to 140° C. at 10° C./min, quenched, and stored in a refrigerator at 4° C. After one week storage, the DSC pan was re-scanned from 5° C. to 140° C. at 10° C./min to determine the extent of starch retrogradation. An empty pan was used in the reference cell.

Example 1

Thermal Inhibition Using an Oven

Waxy corn starch (935 g) and Maltrin M200 (165g) were slurried in water (1500 ml) in a stainless steel beaker and mixed. The slurry was adjusted to pH 9.5 by addition of sodium carbonate and filtered on a Buchner funnel. The cake contained 713 g of water and was air dried without further washing. The air dried mixtures (100 g each) were placed on trays and placed into a Despatch oven at 150° C. After 0.5, 1, 2 and 4 hours respectively, each tray was taken out from the oven. Part of the product (45 g) was re-slurried in water, filtered, washed with additional water, and air dried.

The pasting curve was obtained on a RVA instrument (Foss Technology Corp., Eden Prairie, Minn.). Starch (dry weight 1.375 g) was weighed into a RVA cup. Water was added so that the total water, including the moisture in the sample, was 25.00 g. The starch was mixed with water with a glass stir rod for one minute and placed on the RVA instrument. The temperature profile was as follows:

| Time (min) | Type | Value |
| --- | --- | --- |
| 0 | Speed | 960 rpm |
| 1.0 | Speed | 160 rpm |

(The speed remained at 160 rpm after t=1.0)

| 1.0 | Temp. | 50° C. |
| --- | --- | --- |
| 8.5 | Temp. | 95° C. |
| 13.5 | Temp. | 95° C. |
| 21.0 | Temp. | 50° C. |

It was found that the starch had no breakdown in viscosity and gave a short texture after the thermal inhibition.

Example 2
Comparison With and Without Oligosaccharides
a. 600 g of Cstar Dry GL was added to 6 L of tap water and mixed for 10 minutes. To this mixture, 4000 g of waxy corn starch was added. The pH of the slurry was adjusted to 9.5 with sodium carbonate and mixed for 30 minutes. The slurry was filtered and the resultant cake was dried and ground.

3500 g was added to a fluid bed reactor (FBR) with a fluidizing air flow rate of 350 ft$^3$/hr. The contents of the FBR were first heated to 270° F. for one hour to remove substantially all the moisture from the starch. The contents were then heated to 310° F. The time at which the contents reached 310° F. was labeled as t=0. Samples (200 g) were removed every 25 minutes for 150 minutes. These samples were cooled to room temperature and then were re-slurried in water. The pH of the slurry was adjusted to 5.3 using hydrochloric acid. The slurry was filtered and the cake was washed and air-dried.

Figure 1:
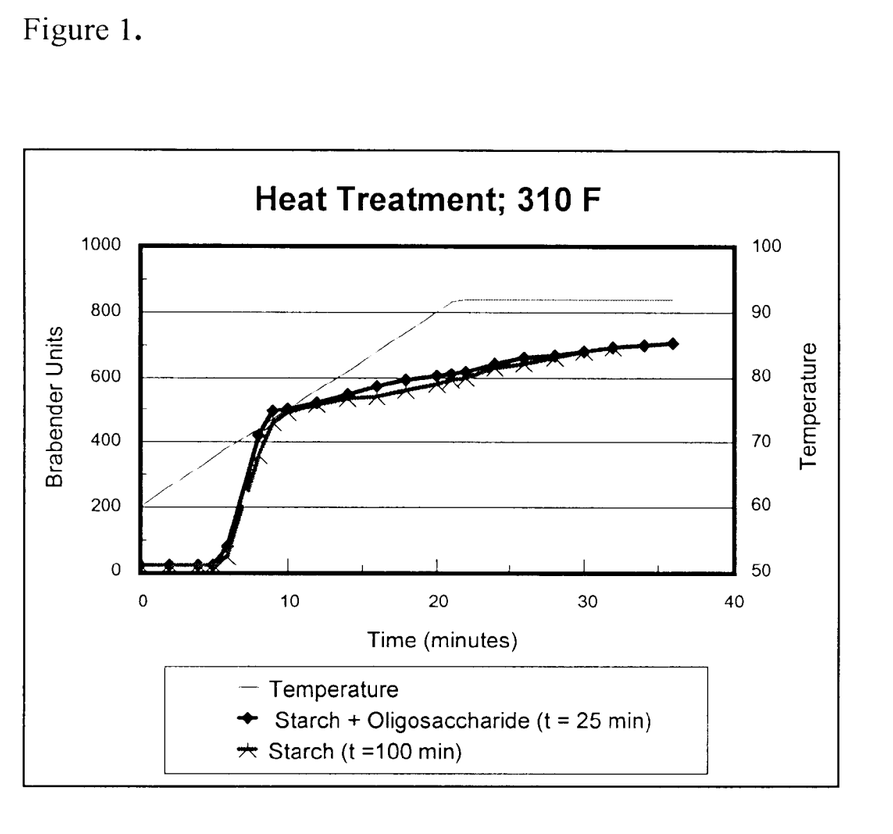
FIG. 1 compares the thermal inhibition curves of examples 2, a and b.

A neutral Brabender was performed as follows. 23 g sample (anhydrous) was added to water for a total charge of 460 g. The pH was between 5.0 and 5.5. The time/temperature profile was as follows:
   60° C. ramp to 92° C. at a heating rate of 1.5 degrees/min. Hold for 10 minutes.
b. The above example was repeated without any Cstar Dry GL. A comparison of the thermal inhibition curves is shown in FIG. 1.

Example 3
Comparison Varying the Composition
a. Example 2 was repeated using dextrose (DE 100) in place of Cstar Dry GL.
b. Example 2 was repeated using Star Dri in place of Cstar Dry GL.
c. Example 2 was repeated using Lodex in place of Cstar Dry GL.
d. Example 2 was repeated using N-LITE® D maltodextrin in place of Cstar Dry GL.
e. Example 2 was repeated using 300 g of Cstar Dry GL.
f. Example 2 was repeated using 40 g of Cstar Dry GL.
g. Example 2 was repeated using tapioca starch in place of waxy corn starch.

The viscosity of the starch/oligosaccharide compositions were compared to that of Example 2 using a neutral Brabender. The results are

TABLE 1

| Example (after FBR treatment at 310° F.) | Viscosity at 92° C. | Viscosity after 10 min @ 92° C. |
| --- | --- | --- |
| 2a (25 min) | 610 | 690 |
| 2a (100 min) | 290 | 370 |
| 2b (100 min) | 590 | 690 |
| 3a (25 min) | 510 | 630 |
| 3a (100 min) | 195 | 280 |
| 3b (25 min) | 630 | 700 |
| 3b (100 min) | 275 | 380 |
| 3c (25 min) | 435 | 540 |
| 3c (100 min) | 105 | 160 |
| 3d (25 min) | 495 | 565 |
| 3d (75 min) | 290 | 370 |
| 3e (25 min) | 535 | 640 |
| 3e (100 min) | 165 | 250 |
| 3f (25 min) | 550 | 660 |
| 3f (50 min) | 400 | 470 |
| 3g (0 min) | 450 | 500 |
| 3g (100 min) | 165 | 265 |

Example 4
Treatment at Lower Temperatures with Faster Reaction Times
a: A starch/oligosaccharide blend was prepared as described in Example 2. The starch was thermally processed in a fluid bed reactor at 295° F. The thermal inhibition reaction occurred faster than observed in a similarly prepared starch in the absence of Cstar Dry GL. As shown in Table 2, a sample processed for 25 minutes with Cstar Dry GL has the same viscosity as a sample processed without Cstar Dry GL for 170 minutes.
b: Example 4a was repeated, except the starch was processed at 280° F. The results are shown in Table 2.

TABLE 2

| EX: | Sample | Process Temp. (° F.) | Process Time | Viscosity @ 92° C. | Viscosity after 10 min @ 92° C. | Viscosity Profile |
| --- | --- | --- | --- | --- | --- | --- |
| 4a | waxy corn starch | 295 | –170 min | 725 | 785 | rising |
|  | waxy corn starch + Cstar Dry GL | 295 | 25 min | 695 | 770 | rising |
| 4b | waxy corn starch | 280 | 60 min | 990 | 980 | slight drop |
|  | waxy corn starch + Cstar Dry GL | 280 | 50 min | 890 | 930 | no break down |
|  | waxy corn starch | 280 | 90 min | 940 | 980 | rising |
|  | waxy corn starch + Cstar Dry GL | 280 | 75 min | 885 | 925 | rising |

As can be seen from example 4b, thermal inhibition occurs more quickly in the presence of an low molecular weight carbohydrate even at lower temperatures. In this example, the control starch has been processed for 50 minutes at 280° F. It has a high viscosity and the Brabender analysis indicates a slight drop in viscosity, indicating an underinhibited/lightly inhibited product. In comparison, the sample processed with the oligosaccharide was processed at 280° F., but for less time, 50 minutes. The viscosity is significantly less, and the Brabender analysis shows a rising curve/no breakdown, indicating a more inhibited product.

Example 5
Production of Higher Viscosity Starches with Non-cohesive Texture

Example 2 was repeated with thermal processing at 280° F., 250° F. and 225° F. for the starch/oligosaccharide blend and at 260° F. for the starch control. The results are summarized in Table 3.

TABLE 3

| Sample | Process Temp. (° F.) | Process Time | Viscosity @ 92° C. | Viscosity after 10 min. @ 92° C. | Viscosity Profile |
|---|---|---|---|---|---|
| waxy corn starch | 260 | 150 min | 980 | 1000 | rising |
| waxy corn starch + oligosaccharide | 250 | 25 min | 1110 | 1170 | rising |

As can be seen from Table 3, the addition of oligosaccharides enables the production of thermally inhibited starches with non-cohesive textures and higher viscosities than are possible without the oligosaccharide addition. As the reaction occurs faster in the presence of the oligosaccharide, less degradation of the starch occurs before the loss of cohesiveness.

The starch sample exhibited a rising viscosity curve, characteristic of a non-cohesive product. In comparison, the starch/oligosaccharide blends produced at lower temperatures display a rising viscosity curve after shorter periods of time and exhibit higher viscosity profile.

Example 6
Continuous Processing 80 lbs of Cstar Dry GL was combined with 2000 lbs of waxy corn starch, such that the final Baume was 12–13. The slurry was mixed for 30 minutes. The pH of the slurry was adjusted to 9.5 with sodium carbonate and further mixed for one hour. The starch/oligosaccharide slurry was centrifuged and dried in a flash drier. The resulting powder was thermally inhibited in a continuous plug-flow type fluidized bed reactor. The reactor had a total volume of 7 ft$^3$, consisting of six chambers and held 150 lbs of starch. The reactor was heated to 300° F. by the circulation of hot oil around the reactor; the fluidizing air was also heated. The mass flow rate of the starch was adjusted such that the residence time of the starch in the reactor was 150 minutes.

A neutral Brabender was performed on the resultant starch/oligosaccharide blend and one produced in a batch reaction using the same conditions except thermal heating was done for 300+minutes. The results are listed in Table 4.

TABLE 4

| Sample | Viscosity @ 92° C. | Viscosity after 10 min @ 92° C. | Processing Time |
|---|---|---|---|
| Batch reactor | 730 | 760 | >300 min (total cycle time) |
| Continuous process | 730 | 760 | 150 min (residence time) |

The presence of an oligosaccharide increases the rate of thermal inhibition to the extent that thermally inhibited, non-cohesive starches can be readily produced in a continuous process within reasonable residence times. The process can be controlled and consistent product can be produced.

Thermally inhibited products produced in this manner had a similar viscosity and textural attributes to a starch prepared in a batch reactor at 300° F. in the absence of oligosaccharide. In a batch reaction, a total cycle time of 300 minutes was required to achieve the same viscosity.

Example 7
Preparation of Starch/oligosaccharide Blend Thermally Inhibited in an Oven a. 1350 g waxy corn starch was slurried in 2250 g water. 150 g Cstar Dry GL was added and mixed. The mixture was adjusted to pH 9.5 by sodium carbonate, mixed for one hour, and spray dried using input temperature of 200–250° C. and output temperature of 90–100° C.

The spray dried product was spread on an aluminum tray and heated at 150° C. for 1, 4, 8, or 24 hours. The heat treated product was cooled to room temperature, slurried into 500 ml of water, adjusted to pH 6.0–6.5 by sodium carbonate, filtered on a Bucher funnel, washed again with 500 ml of water, and air dried.

The air dried samples were analyzed by RVA. Samples after 4-hour treatment showed no breakdown in RVA curves and had a non-cohesive, short texture similar to chemically cross-linked starches.

b. Example 7a was repeated except that the pH was adjusted to 10 instead of 9.5.

Example 8
In Situ Production of Oligosaccharide

Waxy corn starch (1000 g) was slurried in water (15509 g). One ml of alpha-amylase (Ban 240 L commercially available from Nova Nordisk) was added to the slurry. The slurry was placed in a 50° C. water bath and was mixed continuously. The pH of the slurry was 5.9. After 3 hours, 9.4% solubles was generated by enzyme digestion. The slurry was pH adjusted to 3.0 with a 25% HCl solution and kept at pH 3.0 for 30 minutes. Then the pH was re-adjusted to 9.5 with 3% NaOH. The final product was cooled to room temperature and freeze-dried.

Next, the freeze-dried samples were thermally inhibited. The samples were placed onto aluminum trays and dried at 45° C. to 3.6% moisture in 2 hours. The oven temperature was then increased to 150° C. and the samples were kept at 150° C. for 1, 2, 4, and 8 hours. After heat treatment, all samples were re-slurried in one liter of water, adjusted to pH 6.0, filtered on a Bucher funnel, washed with one liter of water and dried. The heat treated starch/oligosaccharide product showed little breakdown in RVA curve at pH 3.0 and had a non-cohesive texture.

The thermal inhibition was repeated using waxy starch which was not enzymatically degraded and therefore did not contain oligosaccharides produced in situ.

Table 5 shows the retrogradation results of these samples as measured by DSC.

TABLE 5

| Sample | To (° C.) | Tp (° C.) | Tc (° C.) | Delta H (J/g) |
|---|---|---|---|---|
| waxy corn - 1 hr. | 40.2 | 51.9 | 71.5 | 9.9 |
| waxy corn - 4 hr. | 42.4 | 53.3 | 71.8 | 9.0 |
| waxy corn - 8 hr. | 41.7 | 52.2 | 72.1 | 9.6 |
| waxy corn/ oligosaccharide blend | 43.9 | 55.2 | 72.5 | 10.3 |
| waxy corn/ | 43.1 | 54.3 | 71.5 | 9.31 |

TABLE 5-continued

| Sample | To (° C.) | Tp (° C.) | Tc (° C.) | Delta H (J/g) |
|---|---|---|---|---|
| oligosaccharide blend 1 hr | | | | |
| waxy corn/ oligosaccharide blend 2 hr | 44.0 | 55.5 | 71.8 | 8.5 |
| waxy corn oligosaccharide blend 4 hr | 44.1 | 55.7 | 70.7 | 7.2 |
| waxy corn/ oligosaccharide blend 8 hr | 46.6 | 57.2 | 71.2 | 4.6 |

The lower the delta H value, the less extent of starch recrystallization (retrogradation) indicating better cold storage stability. As can be seen from Table 5, starch processed in the presence of oligosaccharide has better cold storage stability than that processed without. Further, the longer the starch/oligosaccharide blend was thermally processed, the more improved its cold storage stability.

Example 9
Thermally Inhibited Tapioca Starch/oligosaccharide Blend

Tapioca starch was mixed with Cstar Dry GL (15% w/w based on starch), slurried at 40% solids in water and pH adjusted to 9.5. The slurry was filtered, air dried, and ground. The mixture, containing about 6.5% oligosaccharide based on starch, was further dried to 3.5% moisture at 45° C. in an oven and the oven temperature was then raised to 150° C. The starch/oligosaccharide mixture was held at temperature for periods of time up to 24 hours. Each sample was re-slurried, pH adjusted to 6.0, washed, and air dried.

The RVA viscosity of the heat treated blend decreases with heating time and had a light color comparable with the starch thermally inhibited in the absence of oligosaccharide.

Starch cooks also confirmed the RVA data. One-hour and two-hour samples were viscous when hot. When cold, these two heat treated blends formed smooth gels. As can be seen in Table 6, the DSC values indicate that those blends heat treated for a longer time have lower delta H values, indicating an improvement in cold storage stability. In addition, the DSC values for the thermally treated tapioca/ oligosaccharide blends have lower delta H values than that of the thermally treated tapioca, indicating an improvement in cold storage stability by processing in the presence of oligosaccharide, and these values decrease as thermal inhibition increases.

TABLE 6

| Sample | Time @ 150° C. (hr) | To (° C.) | Tp (° C.) | Tc (° C.) | Delta H (J/g) |
|---|---|---|---|---|---|
| Native Tapioca | | 37.0 | 52.0 | 70.4 | 7.6 |
| Tapioca | 2 | 42.8 | 53.8 | 71.0 | 7.1 |
| Tapioca/Oligosaccharide Blend | 1 | 41.8 | 52.9 | 69.7 | 7.0 |
| Tapioca/Oligosaccharide Blend | 2 | 43.0 | 53.2 | 68.9 | 6.0 |
| Tapioca/Oligosaccharide Blend | 4 | 43.6 | 53.3 | 68.4 | 5.5 |
| Tapioca/Oligosaccharide Blend | 8 | 44.7 | 56.1 | 71.8 | 5.1 |

An inhibited blend with only slight discoloration but excellent high viscosity could be produced by the co-processing of tapioca and oligosaccharide in an oven. This high viscosity blend gives a smooth gel texture when cold.

Example 10
Cold Storage Stability of Thermally Inhibited Starch/ Oligosaccharide Blend The cold storage stability of the thermally inhibited blends of Example 8 were determined using a cherry pie filling prepared as follows.

| Ingredients | Amount (g) |
|---|---|
| Blend of Example 8 | 26.9 |
| Salt | 0.96 |
| Sucrose | 88.5 |
| Lemon Juice | 4.81 |
| Cherry Juice | 306.7 |
| Water | 500 |

The dry ingredients were mixed until the sucrose was dissolved, cooked to the viscosity plateau in a Brabender, and held for 20 minutes at 92° C. The sample was then cooled to 30° C. with stirring and poured into jars. The jars were refrigerated at 40° F. for 18 hours. All but one jar (0 cycle) was placed in a −20° F. freezer for 18 hours. The samples were cycled 6 hours at 70° F. and 16 hours at −20° F. The samples were checked each day for syneresis, opacity, gelling and graininess and the results are shown below in Table 7 (0=no defect, 3=acceptable, 10=waxy corn after 5 cycles).

TABLE 7

| Cycles | Syneresis | Opacity | Gelling | Graininess |
|---|---|---|---|---|
| 0 | 0 | 1 | 0 | 0 |
| 3 | 0 | 3 | 0 | 1 |
| 5 | 2 | 5 | 1 | 2 |

As can be seen from the above results, a cherry pie filling made with a thermally inhibited waxy corn/oligosaccharide blend has acceptable properties for 3 freeze-thaw cycles. After 5 cycles, it has acceptable levels of syneresis, gelling and graininess and is still half as opaque as that made with waxy corn.

We claim:

1. A process of preparing a thermally inhibited starch/low molecular weight carbohydrate blend in which the starch is a granular non-pregelatinized or pregelatinized starch comprising:
   (a) slurrying a starch and an low molecular weight carbohydrate in an aqueous solution to form a blend:
   (b) dehydrating the blend to anhydrous or substantially anhydrous conditions wherein the dehydrated blend is no more than about 15% low molecular weight carbohydrate; and
   (c) heat treating the dehydrated blend at a temperature and for a time sufficient to inhibit the starch.

2. The process of claim 1, wherein the dehydrating step is a thermal dehydrating step.

3. The process of claim 1, wherein the dehydrating and heat treating steps are carried out in an apparatus selected from the group consisting of an industrial oven, a conventional oven, a microwave oven, a dextrinizer, a dryer, and a fluidized bed reactor.

4. The process of claim 1, wherein the heat treating step is carried out at a temperature of 100° C. or greater.

5. The process of claim 4, wherein the heat treating step is carried out at a temperature of from about 120 to about 180° C. for from about 0.5 to about 24 hours.

6. The process of claim 1, wherein the heat treating step is carried out for from about 25 minutes to about 3 hours.

7. The process of claim 1, which further comprises the step of adjusting the pH of the blend to neutral or greater prior to the dehydrating step.

8. The process of claim 1, wherein the starch is a waxy corn starch.

9. The process of claim 1 wherein the low molecular weight carbohydrate is selected from the group consisting of debranched starches, corn syrup solids, dextrose, fructose, and maltose.

10. The process of claim 1, further comprising (d) washing the resultant starch/low molecular weight carbohydrate blend to remove at least some of the low molecular weight carbohydrates from the blend.

11. A thermally inhibited starch/low molecular weight carbohydrate blend, wherein the blend is no more than about 15% low molecular weight carbohydrate, in which the starch is a granular non-pregelatinized or pregelatinized starch.

12. The blend of claim 11 prepared by the process comprising:
    (a) slurrying a starch and an low molecular weight carbohydrate in an aqueous solution to form a blend:
    (b) dehydrating the blend to anhydrous or substantially anhydrous conditions wherein the dehydrated blend is no more than about 15% low molecular weight carbohydrate; and
    (c) heat treating the dehydrated blend at a temperature and for a time sufficient to inhibit the starch.

13. The blend of claim 12, wherein the dehydrating step is a thermal dehydrating step.

14. The blend of claim 12, wherein the heat treating step is carried out at a temperature of 100° C. or greater.

15. The blend of claim 12, wherein the heat treating step is carried out at a temperature of from about 120 to about 180° C. for from about 0.5 to about 24 hours.

16. The blend of claim 12, wherein the heat treating step is carried out for from about 25 minutes to about 3 hours.

17. The blend of claim 11, which further comprises the step of adjusting the pH of the blend to neutral or greater prior to the dehydrating step.

18. The blend of claim 11 having a delta H of no more than about 7.5 J/g, wherein the starch is a waxy corn starch.

19. The blend of claim 11 having a delta H of no more than about 6.0 J/g, wherein the starch is a tapioca starch.

20. The blend of claim 11, wherein the low molecular weight carbohydrate is selected from the group consisting of debrached starches, corn syrup solids, dextrose, fructose, and maltose.

21. The blend of claim 11, wherein the low molecular weight carbohydrate blend contains at least two sugar units joined by glycosidic bonds.

22. The blend of claim 11, wherein the low molecular weight carbohydrate blend has been washed to remove at least some of the the low molecular weiaht carbohydrate from the blend.

23. A composition comprising the blend of claim 11 wherein the blend is used in an industrial composition selected from the group consisting of food and beverage product, pharmaceuticals and nutraceuticals, health care products, personal care products; hair care products, paper products, animal care products; and household products.

* * * * *